(12) United States Patent
Chung

(10) Patent No.: US 11,614,197 B2
(45) Date of Patent: Mar. 28, 2023

(54) RELEASE MECHANISMS

(71) Applicant: Hewlett-Packard Development Company, L.P., Spring, TX (US)

(72) Inventor: Tien Liang Chung, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 45 days.

(21) Appl. No.: 17/363,776

(22) Filed: Jun. 30, 2021

(65) Prior Publication Data

US 2023/0003335 A1   Jan. 5, 2023

(51) Int. Cl.
*F16M 11/04* (2006.01)
*F16M 11/22* (2006.01)

(52) U.S. Cl.
CPC .......... *F16M 11/041* (2013.01); *F16M 11/22* (2013.01); *F16M 2200/02* (2013.01)

(58) Field of Classification Search
CPC .. F16M 11/041; F16M 11/22; F16M 2200/02; A47B 2097/005; A47B 2097/006
See application file for complete search history.

(56) References Cited

U.S. PATENT DOCUMENTS

| | | | | |
|---|---|---|---|---|
| 9,535,457 | B1* | 1/2017 | Vier | B60R 11/02 |
| 2008/0061204 | A1* | 3/2008 | Chang | F16M 11/041 |
| | | | | 248/274.1 |
| 2014/0166826 | A1* | 6/2014 | Liao | F16M 11/041 |
| | | | | 248/158 |

* cited by examiner

*Primary Examiner* — Terrell L McKinnon
*Assistant Examiner* — Jerry Olivier
(74) *Attorney, Agent, or Firm* — Quarles & Brady LLP

(57) ABSTRACT

In some examples, a release mechanism can include an extensible mechanism having a first distal end with a handle, a second distal end with an opening, and a slot. The release mechanism can include a hinge mechanism including a first face including a first tab that defines a first annulus and a second tab defines a second annulus, a second face including a third tab that defines a retention mechanism that is to be positioned in the slot, and a third face located opposite of the first face. The release mechanism can include an ejection mechanism including a first arm having a first projection to extend into the first annulus, a second arm having a second projection to extend into the second annulus, and a third arm to extend through the opening.

14 Claims, 5 Drawing Sheets

RELEASE MECHANISMS

BACKGROUND

A display can be coupled to a stand. A stand refers to a mechanical device that can permit physical adjustment of a display coupled to the stand. For instance, the stand can permit adjustment of a height, orientation, depth, and/or an angle of a display coupled to the stand. A stand can be coupled to a display by an interference fit between corresponding components of the display and the stand and/or can utilize mechanical fasteners such as screws, bolts, etc.

BRIEF DESCRIPTION OF THE DRAWINGS

FIG. 10 is an exploded view of an example of a release mechanism in a disengaged position consistent with the disclosure.

DETAILED DESCRIPTION

Displays refer to output devices that are to display information such as the display of information in a textual or pictorial form. Examples of displays include a thin film transistor liquid crystal display (TFT-LCD) and a plasma (i.e., Gas-Plasma) display, among other types of displays.

A display can be coupled to and subsequently decoupled from a stand. For example, when a user seeks to change a display (e.g., install a new display), change components in or behind the display, or perform maintenance on the display the user may seek to decouple the display from a stand.

Some approaches may employ multiple release mechanisms on a side (e.g., a bottom side) of a display to permit the display to be decoupled (i.e., released) from a stand. Some approaches may rely on use of a tool (e.g., screwdriver) to permit the display to be decoupled from a stand. For instance, some approaches may rely on use of a tool to adjust multiple release mechanisms and thereby permit the display to be decoupled from the stand. However, such release mechanisms may be difficult/time-consuming, for instance, due to employing multiple release mechanisms which can result in a poor user experience. Additionally, such approaches may rely on a user to manually adjust (e.g., turn) multiple mechanical fasteners (e.g., screws) included in a release mechanism with a tool (e.g., a screwdriver) to decouple the display from the stand. As such, such approaches can cause a user to apply a rotational force or other type of force to a housing of a display (e.g., a left/right side of the display) when attempting to adjust the mechanism fasteners and/or the multiple release mechanisms. However, applying such a force can cause the display to bend. Having the display bend can cause the display to break. Moreover, as displays become larger the displays may become increasingly prone to such bending and breakage.

As such, the disclosure is directed to release mechanisms. For instance, a release mechanism can include an extensible mechanism including a handle, a hinge mechanism, and an ejection mechanism, as detailed herein. Notably, such release mechanisms can be actuated by applying a force (e.g., pulling) to the handle to decouple a display from a stand. For instance, a force can be applied to an individual handle to decouple a display from a stand. As such, the release mechanisms can mitigate any additional forces applied to the display and thereby prevent any resultant bending or breakage of the display. Moreover, such release mechanisms can be employed without the use of separate mechanical fasteners (e.g., screws) and can be employed without the use of a separate/dedicated tool (e.g., a screwdriver).

Figure 1A:
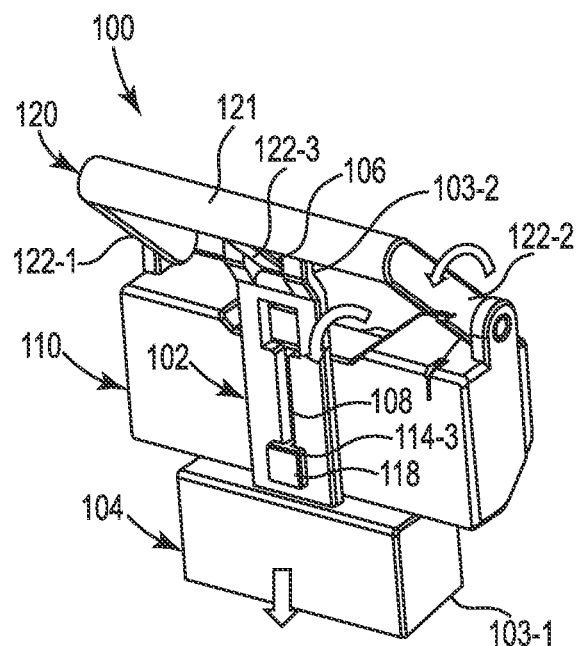
FIG. 1A is a perspective view of an example of a release mechanism in a disengaged position consistent with the disclosure.
Figure 1B:
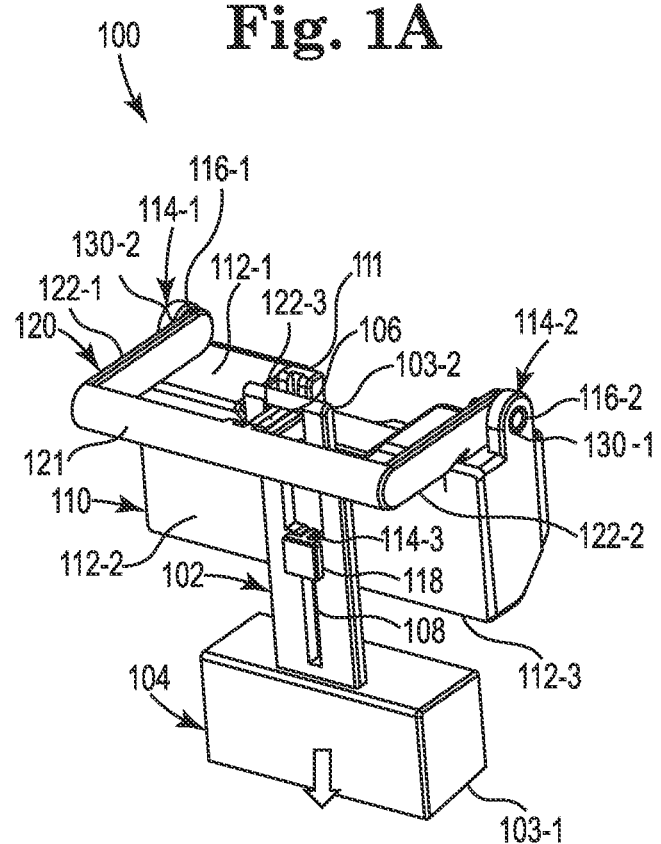
FIG. 1B is a perspective view of an example of a release mechanism in an engaged position consistent with the disclosure.
Figure 1C:
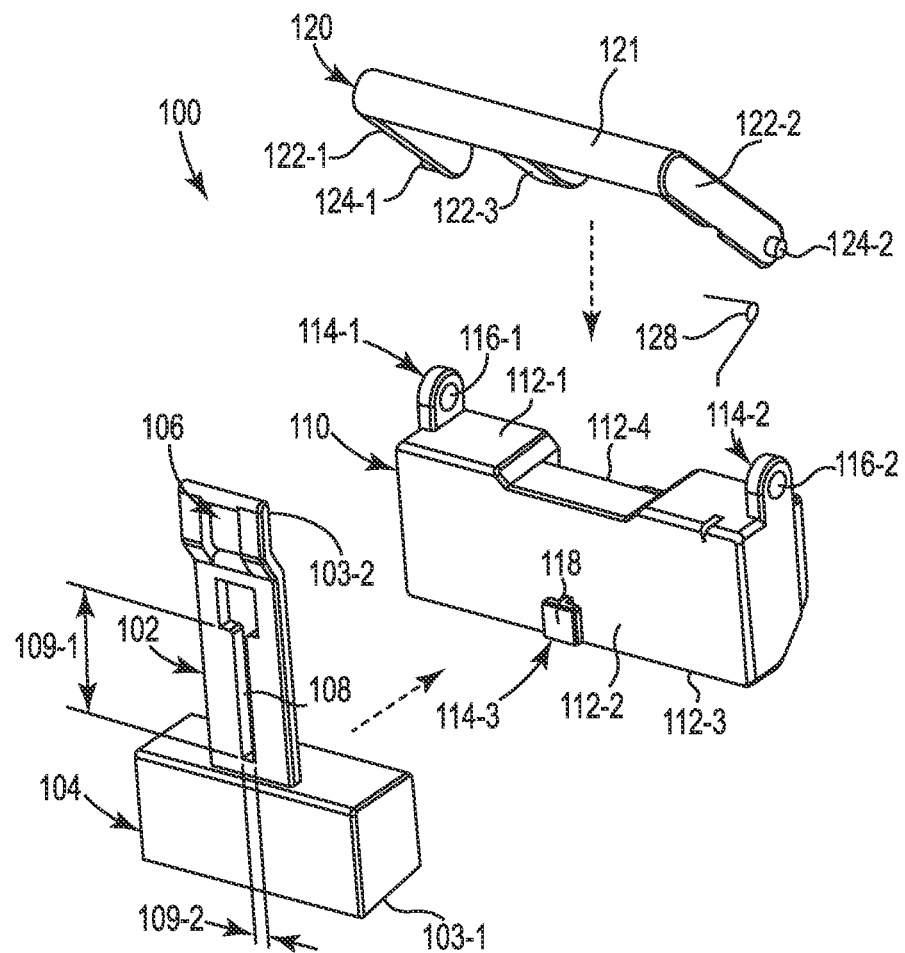

FIG. 1A is a perspective view of an example of a release mechanism 100 in a disengaged position consistent with the disclosure. FIG. 1B is a perspective view of an example of the release mechanism 100 in an engaged position consistent with the disclosure. FIG. 10 is an exploded view of an example of the release mechanism 100 in a disengaged position consistent with the disclosure.

Figure 2:
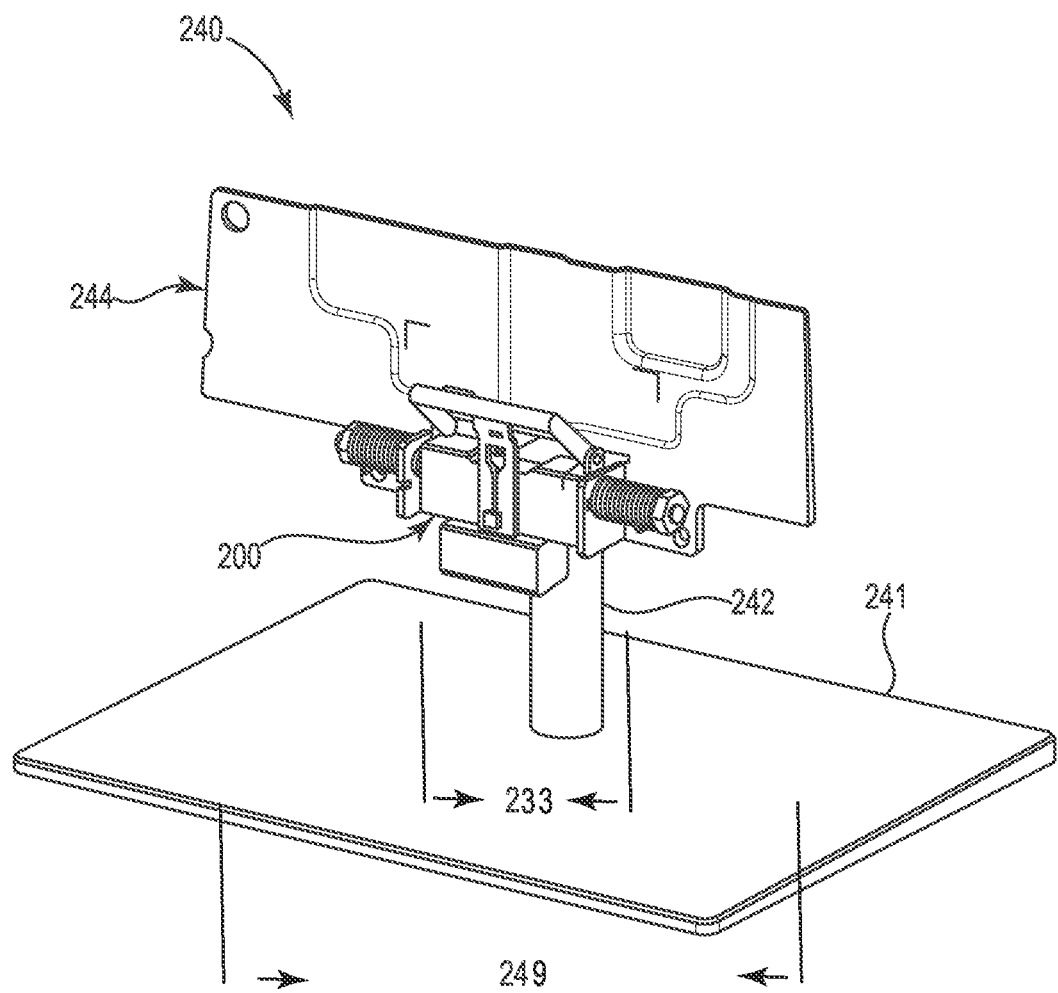
FIG. 2 is a perspective view of an example of a stand including a release mechanism consistent with the disclosure.

As used herein, a "release mechanism" refers to a device shaped to release a display coupled to a stand. The release mechanism 100 can be coupled to a stand. For instance, the release mechanism 100 can be coupled to a stand (e.g., stand 240 as illustrated in FIG. 2) and/or a mounting mechanism (e.g., mounting mechanism 244 as illustrated in FIG. 2) of the stand to selectively release a display, when present, from the stand. As illustrated in FIG. 1A, FIG. 1B, and FIG. 10, the release mechanism 100 can include an extensible mechanism 102, a hinge mechanism 110, and an ejection mechanism 120 that can together selectively release a display, when present, from a stand.

The extensible mechanism 102 can include a first distal end 103-1 and a second distal end 103-2 (opposite the first distal end 103-1). The first distal end 103-1 can form some or all of a handle 104. The handle 104 refers to a mechanical component that promotes application of a force to the extensible mechanism 102 and thereby promotes movement of the release mechanism 100 between an engaged position and a disengaged position, as detailed herein. For instance, the first distal end 103-1 can form a handle such as the handle 104 that is integral (formed from an individual continuous piece of material) with the of portions of the extensible mechanism 102. Having the handle 104 be integral with the extensible mechanism 102 can promote aspects herein such as providing a given aesthetic and/or providing a sealed electronic device when the handle 104 is in a disengaged position (e.g., when the handle 104 is recessed in the housing of the electronic device).

The extensible mechanism 102 can be formed of a continuous extension of material. In other words, the extensible mechanism 102 can be a unitary body, as illustrated in FIG. 1A, FIG. 1B, and FIG. 10. Being a unitary body can promote aspects of retention mechanisms herein such as providing structural integrity. Similarly, the hinge mechanism 110, and/or the ejection mechanism 120 can be formed of a continuous extension of material, in some examples.

However, in some examples, the extensible mechanism 102 be formed of separate and distinct components which are coupled (e.g., mechanically coupled via a fastening mechanism such as screw) together. Being formed of separate and distinct components which are coupled together can permit customization and/or replacement of a mechanism over an operational lifetime of the mechanism. Similarly, in some examples, the hinge mechanism 110 and/or the ejection mechanism 120 can include separate and distinct components which are coupled to together.

Figure 4A:
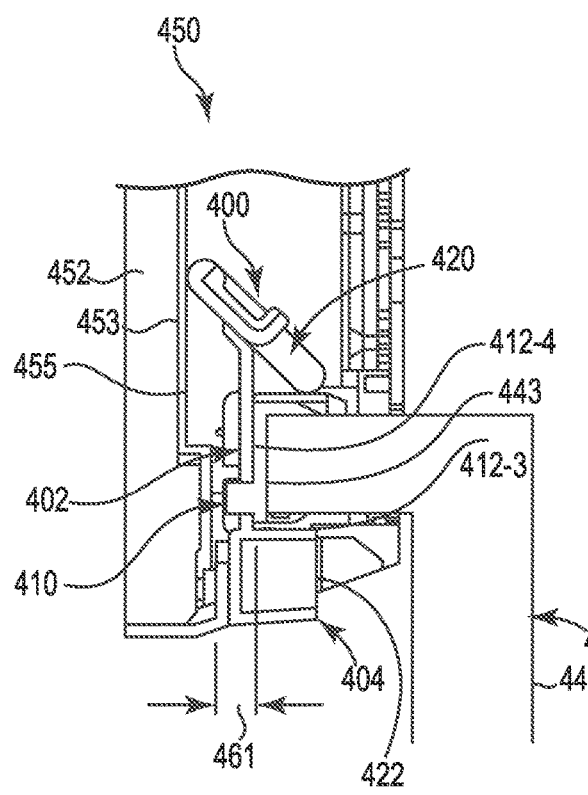
FIG. 4A is a section view of the example release mechanism in a disengaged position consistent with the disclosure.
Figure 4B:
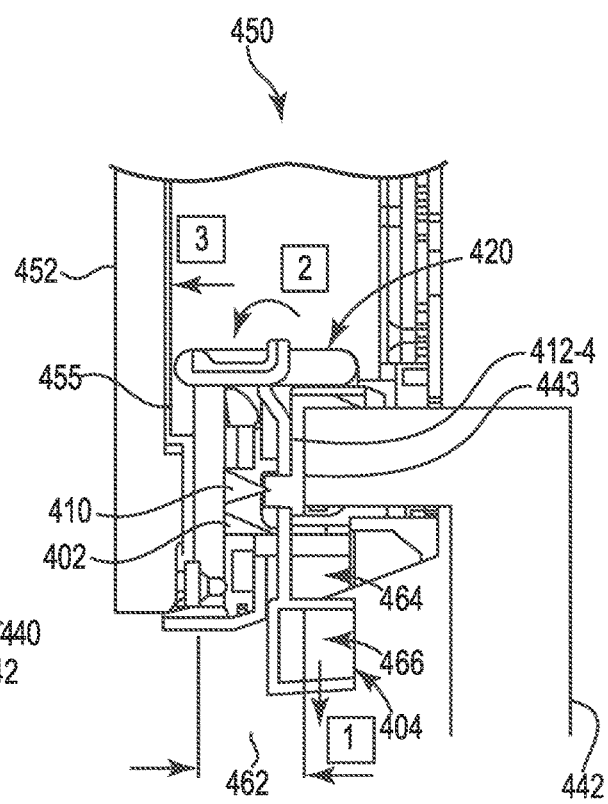
FIG. 4B is a section view of the example release mechanism in an engaged position consistent with the disclosure.

The handle 104 can include a cavity (e.g., cavity 466 as illustrated in FIG. 4B). For instance, the handle 104 can include a rectangular or square shaped cavity. However, other shapes are possible. As detailed herein, the handle 104 can be retracted or otherwise recessed in a housing of an electronic device. For instance, the handle 104 can be in contact with the third face 112-3 when the release mechanism 100 is in a disengaged position (e.g., as illustrated in FIG. 1A).

The second distal end 103-2 can include the opening 106. As detailed herein, the opening 106 can be shaped and/or sized to receive another component. For instance, the opening 106 can be shaped or sized to permit the third arm 122-3 to extend through the opening 106.

The slot 108 can be an elongated slot with a length 109-1 that is greater than a width 109-2 of the slot 108. As used herein, being elongated refers to a component having a length that is greater than a width of a component. For instance, a length 109-1 of the slot 108 can be greater than a width 109-2 of the slot 108.

The slot 108 can have an uninterrupted length 109-1 and width 109-2. As used herein, being uninterrupted refers to a dimension that is without any intervening components along an entirety of the dimension. Having the uninterrupted length 109-1 and the width 109-2 can permit a component such as a retention mechanism 118 to readily move (e.g., translate) along the length 109-1 of the slot 108. For instance, the retention mechanism 118 can translate relative to extensible mechanism 102 along the length 109-1 of the slot 108 between the disengaged position (e.g., as illustrated in FIG. 1A) where the retention mechanism 118 is disposed at a first position in the slot 108, and the engaged position (e.g., as illustrated in FIG. 1B) where the retention mechanism is disposed at a second position, a distance away from the first position, in the slot 108.

For example, the retention mechanism 118 can translate relative to extensible mechanism 102 along the length 109-1 of the slot 108 responsive to the presence or absence of a force applied to the handle 104. For instance, the retention mechanism 118 can translate relative to extensible mechanism 102 along the length 109-1 of the slot 108 to where the retention mechanism 118 is disposed at a first position in the elongated slot 108 in response to removal or absence of a force applied to the handle. Conversely, the retention mechanism 118 can translate relative to extensible mechanism 102 along the length 109-1 of the slot 108 to the engaged position where the retention mechanism 118 is disposed at the second position a distance away from the first position in response to a force being applied to the handle 104, as detailed herein.

The hinge mechanism 110 can include a plurality of faces 112 such as a first face 112-1, a second face 112-2, a third face 112-3, and a fourth face 112-4, etc. The third face 112-3 can be located opposite of (i.e., on an opposite side relative to) the first face 112-1. The fourth face 112-4 can be located opposite the second face 112-2. The faces 112 can be planar faces or can have a different shape.

The faces 112 can have various components extending therefrom. For instance, the first face 112-1 can include a first tab 114-1 that extends a distance from the first face 112-1 and defines the first annulus 116-1. Similarly, the first face 112-1 can include a second tab 114-2 that extends a distance from the first face 112-1 and defines the second annulus 116-2. As used herein, the term "annulus" refers to a part having an opening. The annulus can be ring-shaped or circular. However, the annulus may have a different shape (e.g., rectangular, U-shaped opening, hexagonal, etc.).

The second face 112-2 can include a third tab 114-3 that extends a distance from the second face 112-2 and defines the retention mechanism 118. The retention mechanism 118 can be positioned in the slot 108, as illustrated in FIG. 1A and FIG. 1B. The retention mechanism 118 can move (e.g., translate) along the length 109-1 of the slot 108, as detailed herein.

The ejection mechanism 120 can include a plurality of arms 122 such as a first arm 122-1, a second arm 122-2, and a third arm 122-3. In some examples, the first arm 122-1 and the second arm 122-2 can be co-located on a side (the same individual side such that the first arm 122-1 and the second arm 122-2 extend in the same direction) from the ejection mechanism 120, as illustrated in FIG. 1A and FIG. 1B. In some examples, each of the first arm 122-1, the second arm 122-2, and the third arm 122-3 can be co-located on a side of the ejection mechanism 120, as illustrated in FIG. 1A, FIG. 1B, and FIG. 10.

The arms 122 can be coupled together by a connecting member 121. For instance, the arms 122 can be coupled together by the connecting member 121 that interfaces with the distal ends of each of the arms 122. Having the arms 122 be coupled together by the connecting member 121 can promote aspects herein such as promoting the arms 122 of the ejection mechanism 120 to rotate in unison.

The ejection mechanism 120 can rotate relative to the hinge mechanism 110. For instance, the ejection mechanism 120 can rotate relative to the hinge mechanism 110 responsive to application of a force or absence of a force applied to the handle 104. For example, the first projection 124-1 of the first arm 122-1 can extend into the first annulus 116-1 to rotatably couple the ejection mechanism 120 to the first tab 114-1 of the hinge mechanism 110. Similarly, the second projection 124-2 of the second arm 122-2 can extend into the second annulus 116-2 to rotatably couple the ejection mechanism 120 to the second tab 114-2 of the hinge mechanism 110. In this way, the ejection mechanism 120 can rotate, relative to the hinge mechanism 110, between the disengaged position (e.g., as illustrated in FIG. 1A) and the engaged position (e.g., as illustrated in FIG. 1B).

The third arm 122-3 of the ejection mechanism 120 can extend through the opening 106. For instance, the third arm 122-3 can extend through the opening 106 to movably couple the ejection mechanism 120 to the second distal end 103-2 of the extensible mechanism 102. As such, a given point along the third arm 122-3 that extends through the opening 106 and is in contact with the ejection mechanism 120 can vary as the release mechanism 100 moves.

In some examples, the third arm 122-3 can truncate in a hook 111 or other arcuate portion, as illustrated in FIG. 1B. The hook 111 can contact a portion of the extensible mechanism 102 such as contacting the extensible mechanism 102 when the release mechanism 100 is in an engaged position, as illustrated in FIG. 1B. For instance, responsive to the force applied on the handle 404, the hook 111 can engage with the second distal end 103-2 of the extensible mechanism 102.

In some examples, the release mechanism 100 can include a torsion mechanism 128 to disposition the release mechanism 100 to a given position. For instance, the release mechanism 100 can include the torsion mechanism 128 to disposition the release mechanism 100 to the disengaged position. The torsion mechanism 128 can be a torsion spring, other type of mechanism to disposition the release mechanism 100 to a given position.

The torsion mechanism 128 can be disposed at an interface 130-1 between the first projection 124-1 and a first annulus 116-1, an interface 130-2 between the second projection 124-2 and a second annulus 116-2, or both, to disposition the release mechanism 100. For instance, the torsion mechanism 128 can be an individual torsion mechanism located at the interface 130-2 between the second projection 124-2 and a second annulus 116-2, as illustrated in FIG. 10. The torsion mechanism 128 can apply a force directly or indirectly on the extensible mechanism 102, on the hinge mechanism 110, and/or on the ejection mechanism 120 to deposition the handle 104 to be retracted or otherwise recessed in a housing of an electronic device, as detailed herein, in a disengaged position such that the handle 104 is in contact with the third face 112-3.

Figure 3:
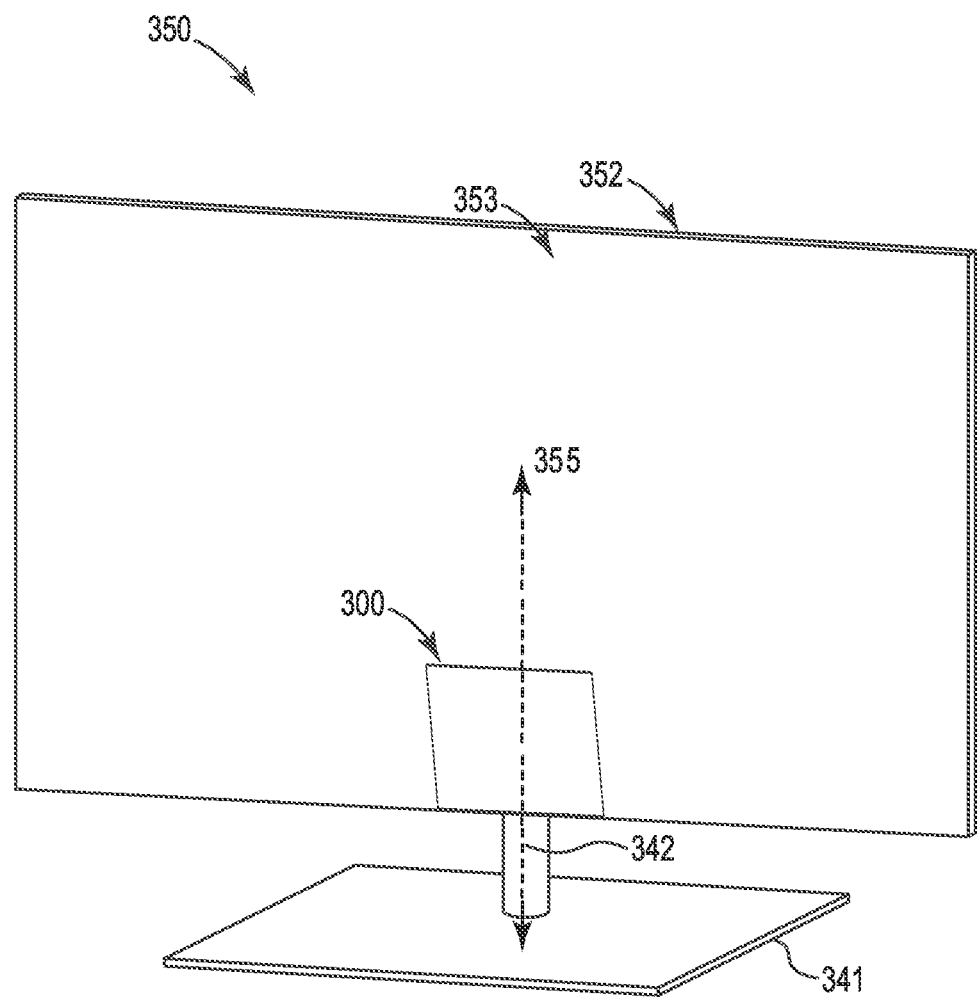
FIG. 3 is a perspective view of an electronic device having a housing and an example release mechanism consistent with the disclosure.

FIG. 2 is a perspective view of an example of a stand 240 including the release mechanism 200 consistent with the disclosure. The stand 240 can include various components such as a base 241, a stand arm 242, and a mounting mechanism 244, among other possible components. The mounting mechanism 244 can receive a display (e.g., display 352 as illustrated in FIG. 3). As illustrated in FIG. 2, the mounting mechanism 244 can include a plate having grooves, openings, notches, and/or other features to permit the display to be coupled via the mounting mechanism 244 to the stand 240. The mounting mechanism 244 or other component can be articulated, rotated, or otherwise moved to adjust aspects such as height, angle, etc. of the display, when coupled to the mounting mechanism 244.

The release mechanism 200 can be moved between an engaged position and a disengaged position to selectively release the display from the mounting mechanism 244, as detailed herein. For instance, as illustrated in FIG. 2, the release mechanism 200 can be an individual release mechanism to selectively release the display from the mounting mechanism 244 or other portion of a display, in contrast to other approaches such as those which employ multiple release mechanisms to permit release of a display.

As illustrated in FIG. 2, the release mechanism 200 can be centrally located relative to the stand 240. For instance, a mid-point of the release mechanism 200 as taken along a width 233 of the release mechanism 200 can be co-located at or near (within 10 percent of) a mid-point of the mounting mechanism 244 as taken along a width 249 of the mounting mechanism 244. Having the release mechanism 200 be centrally located can promote aspects herein such as mitigating any bending or breakage of a display coupled to the stand 240, in contrast to other approaches such as those that employ multiple release mechanisms that are not centrally located relative to a stand.

FIG. 3 is a perspective view of an electronic device 350 having a housing 353 and the release mechanism 300 consistent with the disclosure. The release mechanism (as represented by the lines and the element identifier 300) can be disposed inside of the housing 353, as illustrated in FIG. 3. For instance, when in the disengaged position the release mechanism 300 can be disposed inside of the housing 353 such that some or all of the release mechanism is obscured from the perspective of a user of the electronic device 350. For instance, all but a handle of the release mechanism 300 can be obscured from the perspective of the user of the electronic device.

As mentioned, the release mechanism 300 can be movable between the disengaged position and an engaged position. For instance, the release mechanism 300 can be dispositioned toward a disengaged position by a first (rotational) force applied by a torsion mechanism (e.g., torsion mechanism 128 as detailed herein), or can be moved to an engaged position by a second force (e.g., translational) force applied to a handle (e.g., handle 104, as detailed herein).

As used herein, the term "housing" refers to an enclosure or other support structure of a device. For example, the housing 353 can be an outer shell making up a portion of a computing device, a display device, and/or an all-in-one (AIO) computing device, etc. As used herein, an AIO computing device refers to a computer which integrates the internal components into the same housing as the display and can offer a touch input functionality of a tablet device while also providing a processing power and a viewing area of desktop computing systems.

The housing 353 can include a recess or recessed surface (e.g., recess 464 as illustrated in FIG. 4A and FIG. 4B). The recess can be a portion of a structure defining an opening and/or a cavity in the housing 353. As used herein, the term "recess" refers to a portion of a structure that is located away from an outer surface of the structure. The recess can be located on an interior portion of the housing 353. The opening formed by the recess in the housing 353 can receive a portion of the release mechanism 300 and its constituent components (a portion of the handle), as is further described herein.

FIG. 4A is a section view of the electronic device (i.e., computing device) 450 (as taken along section line 355 of FIG. 3) of the release mechanism 400 in a disengaged position consistent with the disclosure. FIG. 4B is a section view of the electronic device 450 (as taken along section line 355 of FIG. 3) of the release mechanism 400 in an engaged position consistent with the disclosure.

The electronic device 450 can include the display 452. The display 452 can include an internal frame 455 that is disposed in the housing 453. The release mechanism 400 can contact and apply a force (e.g., as represented by the arrow "3") in a direction on the internal frame 455. The force can be applied in a direction that is normal to a fourth face 412-4 of the hinge mechanism 410. For instance, the force can be applied in a direction that is normal to a fourth face 412-4 responsive to application of a force (e.g., as represented by the arrow "1") to the handle 404. That is, the hinge mechanism 410 can include the fourth face 412-4 that defines a recess 464, and the arm 442 can include a distal portion that forms a protrusion which can be disposed in the recess 464 when the release mechanism 400 is coupled to the arm 442 of the stand 440.

In some examples, the ejection mechanism 420 can maintain contact with a portion of the internal frame 455 along an entirety of a path of travel of the ejection mechanism 420 between the disengaged position and the engaged position. Having the ejection mechanism 420 remain in maintain contact with a portion of the internal frame 455 along an entirety of a path of travel of the ejection mechanism 420 between the disengaged position and the engaged position can promote aspects herein such as providing a given tactile feedback via the handle 404 to a user and/or ensuring uniform application of force to various components in the release mechanism 400.

As mentioned, the handle 404 can be removed from a volume of a recess 464 when the release mechanism is in an engaged position (e.g., when the force is applied to the handle 404. For instance, the handle 404 can include a cavity 466 which the promote application of force to the handle 404 for instance by permitting a user to insert an object/hand into the cavity 466 which can apply a force on the handle 404. As illustrated in FIG. 4A and FIG. 4B, the cavity 466 can be orientated toward the stand 440 when the display 452 is coupled to the stand 440. Having the cavity 466 orientated toward the stand can promote ease of use of the release mechanism 400 and can provide a desired aesthetic of the release mechanism 400.

In some examples, an arm such as those described herein can rotate to cause the ejection mechanism 420 to exert the force (e.g., a release force) on the internal frame 455. For instance, in response to the force applied to the handle 404 a first arm (e.g., the first arm 122-1 as illustrated in FIG. 10) can rotate (as represented by arrow "2") about a first projection (e.g., the first projection 124-1) and the first annulus (116-1) to cause the release mechanism 400 to move from a disengaged position to an engaged position and thereby cause the ejection mechanism 420 to exert the force on the internal frame 455. Similarly, in response to the force "1" applied to the handle 404 a second arm (e.g., the second arm 122-2 as illustrated in FIG. 10) can rotate about a second projection (e.g., the second projection 124-2 as illustrated in FIG. 10) and the second annulus (116-2 as illustrated in FIG. 10), for instance, to cause the release mechanism 400 to move from a disengaged position to an engaged position and thereby cause the ejection mechanism 420 to exert the force on an internal frame 455.

Release of the display 452 from the stand 440 such as being released from the arm 442 of the stand 440 can coincide with a change in a distance between the internal frame 455 and the stand 440. For instance, in the disengaged position the internal frame 455 can be a first distance 461 from the stand 440 (e.g., a first distance away from a face 443 of the stand 440 that is proximate to the release mechanism 400). Yet, in the engaged position the internal frame 455 can be a second distance 462 from the face 443 that is greater than the first distance 461 and can thereby permit release of the display 452 from the stand 440.

As used herein, the "disengaged position" refers to an orientation of the release mechanism 400 in which the handle 404 is disposed in the recess 464 of the housing 453. For instance, when the release mechanism 400 is in the disengaged position, a torsion mechanism (e.g., the torsion mechanism 128 as illustrated in FIG. 10) can retain the handle 404 in the recess 464. For example, the handle 404 can be retained in the recess 464 and be in contact with the third surface of the 412-3 of the hinge mechanism 410, as illustrated in FIG. 4A.

As used herein, the "engaged position" refers to an orientation of the release mechanism 400 in which the handle 404 is disposed outside of a housing 453. For instance, when in the engaged position the handle 404 can be disposed outside of the recess 464 in the housing 453, as illustrated in FIG. 4B. Thus, when in the engaged position there is an absence of contact (no contact) between the handle 404 and the housing 453, in some examples.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" can refer to one such thing or more than one such thing.

The figures herein follow a numbering convention in which the first digit corresponds to the drawing figure number and the remaining digits identify an element or component in the drawing. For example, reference numeral 102 may refer to element 100 in FIG. 1A and an analogous element may be identified by reference numeral 300 in FIG. 3. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples and data provide a description of the method and applications, and use of the system and method of the disclosure. Since many examples can be made without departing from the spirit and scope of the system and method of the disclosure, this specification merely sets forth some of the many possible example configurations and implementations.

What is claimed is:

1. A release mechanism, comprising:
    an extensible mechanism having a first distal end with a handle, a second distal end with an opening, and a slot;
    a hinge mechanism including:
        a first face including:
            a first tab that defines a first annulus; and
            a second tab defines a second annulus;
        a second face including a third tab that defines a retention mechanism that is to be positioned in the slot; and
        a third face located opposite of the first face; and
    an ejection mechanism including:
        a first arm having a first projection to extend into the first annulus;
        a second arm having a second projection to extend into the second annulus; and
        a third arm arranged to extend through the opening, wherein:
            the handle is in contact with the third face when the release mechanism is in a disengaged position; and
            the handle is spaced a distance away from the third face when the release mechanism is in an engaged position.

2. The release mechanism of claim 1, wherein the slot is an elongated slot having an uninterrupted length, and wherein the retention mechanism of the hinge mechanism is arranged to translate relative to the extensible mechanism along the length of the slot between:
    the disengaged position where the retention mechanism is disposed at a first position in the elongated slot; and
    the engaged position where the retention mechanism is disposed at a second position, a distance away from the first position, in the elongated slot.

3. The release mechanism of claim 2, wherein the ejection mechanism is arranged to rotate relative to the hinge mechanism, and wherein:

the first projection of the first arm extends into the first annulus to rotatably couple the ejection mechanism to the first tab of the hinge mechanism; and the second projection of the second arm extends into the second annulus to rotatably couple the ejection mechanism to the second tab of the hinge mechanism.

4. The release mechanism of claim 1, wherein the release mechanism further comprises a torsion mechanism disposed at an interface between the first projection and the first annulus, the second projection and the second annulus, or both, to disposition the release mechanism to the disengaged position.

5. The release mechanism of claim 1, the handle further comprises a cavity formed in the first distal end of the extensible mechanism.

6. The release mechanism of claim 5, wherein the cavity is orientated toward a stand, when the release mechanism is coupled to the stand.

7. The release mechanism of claim 1, wherein the first arm, the second arm, and the third arm are each located on a side of the ejection mechanism.

8. A stand, comprising:
a mounting mechanism to receive a display; and
a release mechanism coupled to the mounting mechanism to selectively release the display from the mounting mechanism, the release mechanism comprising:
an extensible mechanism having a first distal end with a handle, a second distal end with an opening, and an elongated slot;
a hinge mechanism including:
a first face including:
a first tab that defines a first annulus; and
a second tab defines a second annulus;
a second face including a third tab that defines a retention mechanism that is positioned in the slot; and
a third face located opposite of the first face; and
an ejection mechanism including:
a first arm having a first projection that extends through the first annulus to couple the ejection mechanism to the first tab;
a second arm having a second projection that extends through the second annulus to couple the ejection mechanism to the second tab; and
a third arm including a hook, the third arm is arranged to extend through the opening to couple the ejection mechanism to the second distal end, wherein:
the handle is in contact with the third face when the release mechanism is in a disengaged position; and
the handle is spaced a distance away from the third face when the release mechanism is in an engaged position.

9. The stand of claim 8, wherein the hinge mechanism further comprises a fourth face that defines a recess.

10. The stand of claim 9, wherein responsive to a force applied on the handle:
the first arm is arranged to rotate about the first projection and the first annulus from the disengaged position to the engaged position to cause the ejection mechanism to exert a release force on an internal frame of the display; and
the second arm is arranged to rotate about the second projection and the second annulus from the disengaged position to the engaged position to cause the ejection mechanism to exert a release force on the internal frame of the display.

11. The stand of claim 8, wherein responsive to the force applied on the handle the hook of the third arm is to engage with the second distal end of the extensible mechanism.

12. A computing device, comprising:
a stand including a mounting mechanism;
a display coupled to the mounting mechanism; and
a release mechanism coupled to the stand and in contact with the display, the release mechanism comprising:
an extensible mechanism having a first distal end with a handle, a second distal end with an opening, and a slot;
a hinge mechanism including:
a first face including:
a first tab that defines a first annulus; and
a second tab defines a second annulus;
a second face including a third tab that defines a retention mechanism that is to extend into the slot; and
a third face located opposite of the first face; and
an ejection mechanism including:
a first projection that extends through the first annulus to couple the ejection mechanism to the first tab;
a second projection that extends through the second annulus to couple the ejection mechanism to the second tab; and
a third arm that extends through the opening to couple the ejection mechanism to the second distal end, wherein:
the handle is in contact with the third face when the release mechanism is in a disengaged position; and
the handle is spaced a distance away from the third face when the release mechanism is in an engaged position.

13. The computing device of claim 12, wherein the computing device is an all-in-one (AIO) computing device.

14. The computing device of claim 12, wherein the release mechanism is centrally located relative to the stand.

* * * * *